Patented Feb. 19, 1935

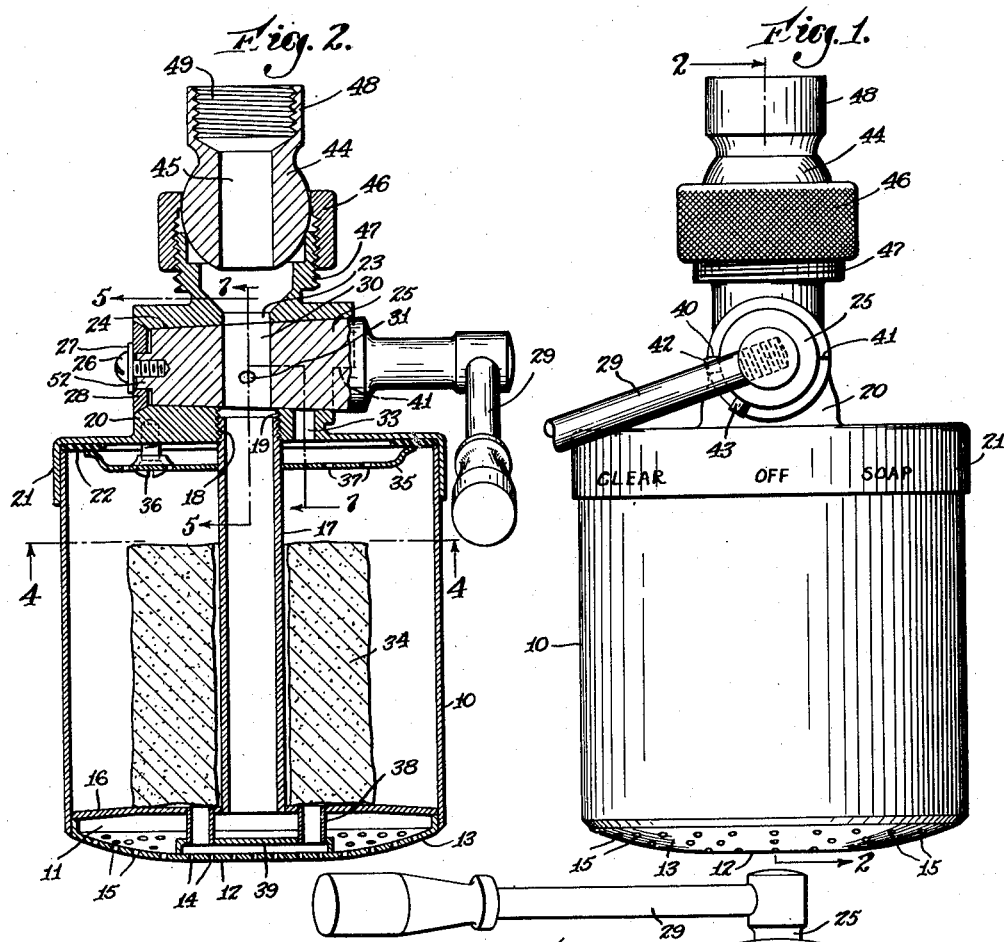
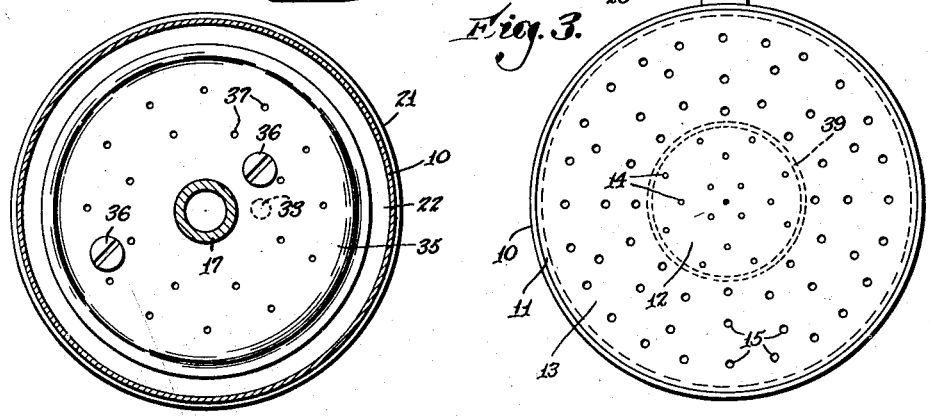

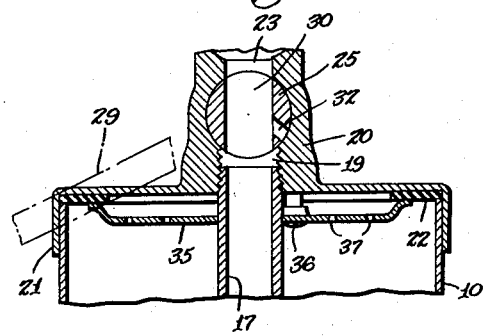
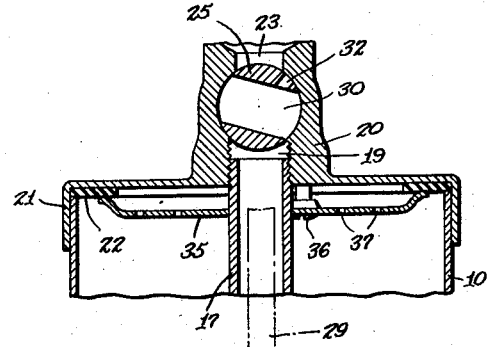
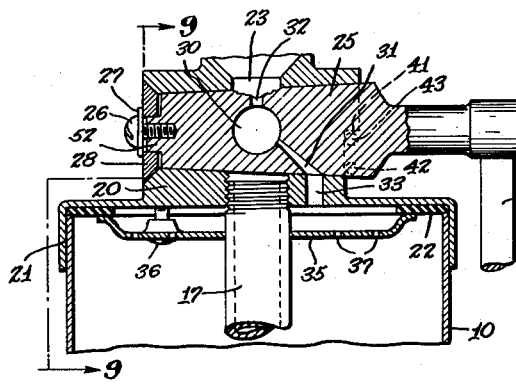
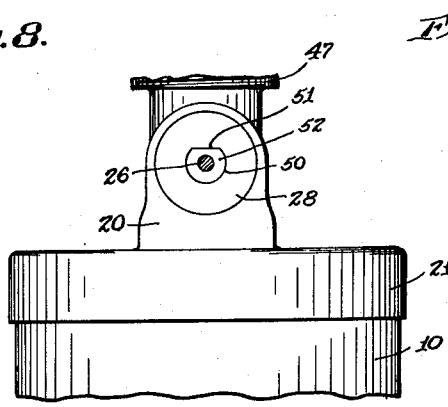

1,991,388

UNITED STATES PATENT OFFICE 1,991,388

SPRAYING APPARATUS

Raymond Healy, Cold Spring, N. Y.

Application February 17, 1934, Serial No. 711,756

9 Claims. (Cl. 299—84)

My present invention relates to spraying apparatus, and more particularly to a novel and improved device to spray either soapy or clear water.

An important object of the invention is to provide a unitary device or apparatus whereby either soapy water or clear or rinsing water may be sprayed at the will of the operator.

Another object of the invention is to provide a spraying device which is simple to manufacture and operate, economical, compact, neat and attractive in appearance, and highly efficient.

A feature of the invention resides in the fact that the means for delivering either soapy or clear water are so positive in their operation that the separate sprays are clearly defined and distinct, one from the other, and when clear water is being sprayed or discharged there is not the slightest trace of soap therein.

My novel spraying device is capable of a wide range of use, the device illustrated herein being primarily adapted for showers for bath use, but in varying sizes is applicable to such uses as washing automobiles, dish washing, and the like, and it will be understood that the same is capable of use for flexible installations, as well as in the fixed application herein shown.

It will be apparent that the operation of my novel device and the valve therein may be effected by other means than the lever or handle illustrated.

Another, and important feature of the present invention, resides in so constructing my novel device that the water from the spray jets communicating with the soap chamber, which chamber surrounds the clear water conduit, is so by-passed as to be discharged from said spray jets inside of the circle of spray jets for the clear water.

A still further feature of the invention consists in the construction of the jet end of my novel spray, wherein the jets for the soapy water are in a substantially flat central part of said end, while the jets for the clear water are on an inclined or arcuate portion surrounding said central portion. In this manner there is obtained a concentrated discharge of soapy water, and a widely diffused discharge of clear water of greater volume than said soapy water discharge.

Another advantage of my present device resides in the fact that but a small volume of water is introduced into the soap chamber, and this in a series of small jets, so that the wearing action on the soap is greatly diminished, resulting in longer life of the soap utilized and less frequent filling of the soap chamber.

All of these advantages and features will be instantly apparent to and appreciated by those skilled in this art.

Other objects and features of the invention, together with details of construction, combinations of parts, and advantages, will be hereinafter more fully pointed out, described and claimed.

Referring to the drawings, illustrating preferred embodiments of my invention,

Fig. 1 is a side elevation of my novel spraying apparatus;

Fig. 2 is a vertical sectional view on the line 2—2 of Fig. 1;

Fig. 3 is a bottom plan view of said device;

Fig. 4 is a cross-sectional view on the line 4—4 of Fig. 2;

Fig. 5 is a fragmentary cross-sectional view on the line 5—5 of Fig. 2;

Fig. 6 is a fragmentary sectional view illustrating the valve in a different position;

Fig. 7 is a fragmentary sectional view on the line 7—7 of Fig. 2 illustrating the valve in still another position;

Fig. 8 is a fragmentary sectional view on the line 8—8 of Fig. 7; and

Fig. 9 is a view, partly in section, on the line 9—9 of Fig. 8.

Referring now to the drawings, for a particular description of the invention, its construction and operation, my present novel device comprises a cylinder 10 having secured in one end thereof a cup-shaped member 11, having a flat central portion 12 and an arcuate annular portion 13. In these two portions are two groups of apertures 14 and 15, the apertures 14 being located in the flat portion 11 and within the ring formed by the apertures 15.

The upwardly extending flange of the cup 11 has a close fit in the end of the cylinder 10, and is preferably held therein by suitable means, such as solder. Within the cylinder 10 and resting on the said flange is a plate 16, preferably also soldered in position, the plate 16 and cup 11 defining a space or double-bottom therebetween.

Fixed to the plate 16 on the interior of the cylinder 10 is a tube 17 extending vertically therefrom to above the height of the cylinder 10. The upper end of the tube 17 is threaded, as illustrated at 18, and this threaded end is screwed into the threaded passage 19 in the head 20. This head 20 is provided with a depending annular flange 21 within which the walls of the cylinder 10 have a snug fit to prevent water leakage, a gasket 22 also being provided.

The threaded passage 19 is alined with a passage 23 in the head 20 and interposed in the head between said passages is a preferably tapered valve chamber 24 in which is disposed a preferably tapered plug valve 25, said valve being held in position by a screw 26 bearing against a washer 27 which in turn bears against a disc 28. Said disc 28 and the head 20 have inclined cooperated faces to prevent leakage at this point.

Integral with the valve 25 is a projection in which is threaded a handle 29 for manual manipulation thereof, although it will be understood and appreciated that other means of operating this valve may be provided, depending largely upon the type of installation of the device. This valve has a bore or port 30 therethrough, to aline, at the will of the operator, with the passages 19 and 23, and hence with the tube 17.

Said valve also has a lead 31 therethrough, radial to the bore 30, and this lead has a point of entrance into the bore 30. The valve plug also has a short radial lead 32 adapted, when the valve is in the position shown in Fig. 7, to conduct water therethrough and through the lead 31, to and through the port 33 in the head 20, said last named port communicating with the interior of the cylinder 10 to conduct water thereto.

In the interior of the cylinder 10, which I designate as the soap chamber, and resting on the plate 16 is a cake of soap 34, which may be of any type or nature depending upon the particular use to which the spray is to be put.

In order to prevent excessive wear on the soap 34, I secure a cup 35 to the head 20 by means of screws 36, the edge of this cup bearing against the gasket 22, as clearly shown in Fig. 2. This cup 35 is provided with perforations 37, through which water admitted through the port 33 is discharged in a plurality of small streams, thus breaking up the force of the water and greatly lengthening the life of the soap in the soap chamber.

Soapy water from the soap chamber is discharged therefrom through the tubes 38 into the inverted cup 39 and thence through the group of apertures 14. The apertures 14 being in the flat portion 12 of the cup 11, the soapy water is discharged in a concentrated spray, as will be readily understood. When clear water enters the tube 17, it is discharged therefrom into the double bottom defined by the plate 16 and cup 11, and is discharged therefrom through the jets or apertures 15, which, being located on the arcuate portion 13 of the cup 11, discharge the water in a diffused spray.

This bypassing of the soapy water to be discharged in a concentrated spray within the diffused spray of clear water is an important feature, and one which will be apparent to and appreciated by those skilled in this art.

Register and alinement of the port 30 with the passages 19 and 23, and of the leads 32 and 31 with the passage 23 and port 33 is assured by the provision of the shoulders 40 and 41 in the head at the outer end of the tapered valve chamber 24, and of the studs or pins 42 and 43 on the plug valve 25. The stud 42 limits the rotational movement of the valve 25 in one direction, to the left as viewed in Fig. 1, so that when the valve handle 29 is in the position illustrated in full lines in Fig. 1, and also as illustrated in Figs. 2 and 5, the bore 30 will be in register with the passages 23 and 19, so that clear water only is being discharged or sprayed; when the handle 29 is in the position illustrated in dotted lines in Fig. 6, the valve is entirely closed, and when the handle 29 is in the position illustrated in Figs. 7 and 8, with the pin 43 engaging the shoulder 41, the leads 32 and 31 are in register with the ports 23 and 33.

Should any wear occur between the valve 25 and its seat or chamber 24, this can be compensated for by adjustment of the screw 26, as will be readily apparent.

In the embodiment illustrated in the instant application, which is intended primarily for operation and use as a shower, water is conducted to the passage 23 in the head 20 by means of a ball member 44 having a passage 45 therethrough. This ball member is connected to the head 20 by a knurled nut 46, functioning as a socket member and threaded onto the upper threaded end 47 of the head 20, thus constituting a ball and socket joint for universal adjustment of the spray.

The stem 48 of the ball member 44 is internally threaded at 49 for attachment to any convenient water outlet.

The head 20 may very conveniently be made as a die casting, as will be apparent to those skilled in this art. The sealing disc 28 is provided with an aperture 50 having a squared side 51, and the plug valve 25 has a projection 52 to fit in said aperture, so that the disc will rotate with the valve.

The operation of my novel device is extremely simple, and will be readily understood by those skilled in this art, being briefly described as follows:

The ball member 44 being connected to any suitable source of water supply, and a cake of soap 34 being located in the cylinder 10, if it is desired to supply a soapy spray, the operator manipulates the handle 29 until the stud 43 engages the shoulder 41, to aline the leads 32 and 31 with the passage 23 and port 33, whereupon water will flow therethrough into the cup 35, thence through the apertures 37 into the main chamber of the cylinder 10, impinging against the soap 34, admixing therewith and directing a sudsy spray through the tubes 38 into the inverted cup 39 and thence through the apertures 14. After this spray has continued for the desired length of time, the operator simply throws the handle 29 to its opposite position, with the stud 42 engaging the shoulder 40, disalining the leads 31 and 32 from the passage 23 and port 33, and brings the bore 30 into register with the passages 23 and 19, thus directing a stream of clear water therethrough and through the tube 17 into the double bottom and thence outwardly through the apertures 15. When the handle 29 is moved to the position shown in Fig. 6, the device is closed, and no water at all is discharged or sprayed therefrom.

It will be thus apparent that I have devised an efficient, simple and desirable alternately operating spray, and since I believe the same to be novel, I have therefore claimed the same broadly in the present application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. A spraying device including a bowl having a soap holding chamber therein, a tube projecting through said chamber, a plurality of spray jets arranged in annular formation in one end of said bowl and communicating with said tube, a plurality of spray jets in said end of said bowl within the annular formation of said first jets, and communicating with said soap chamber, a head to which said bowl is attached, a passage in said head communicating with said tube, a port in said head communicating with said soap chamber, a common source of water supply, and means interposed between said common source of water supply and the passage and port in said head and operable to alternately conduct water under pressure to said tube and said soap chamber.

2. A spraying device including a bowl having a soap holding chamber therein, a tube projecting through said chamber, a plurality of spray jets arranged in annular formation in one end of said bowl and communicating with said tube, a plurality of spray jets in said end of said bowl within the annular formation of said first jets, means to by-pass water from said soap chamber to said second jets, a head to which said bowl is attached, a passage in said head communicating with said tube, a port in said head communicating with said soap chamber, a common source of water supply, and means interposed between said common source of water supply and the passage and port in said head and operable to alternately conduct water under pressure to said tube and said soap chamber.

3. A spraying device including a bowl having a soap holding chamber therein, a plate at the outer end of said soap chamber spaced from the end of the bowl, a tube fixed to said plate and projecting through said chamber, an inverted cup disposed in the space defined by said plate and the adjacent end of the bowl, a plurality of spray jets in the end of the bowl communicating with said inverted cup, water conducting means communicating with said soap chamber and the interior of said inverted cup, and a plurality of spray jets in the said end of said bowl outside of the area defined by said inverted cup and communicating with said tube.

4. A spraying device including a bowl having a soap holding chamber therein, a plate at the outer end of said soap chamber spaced from the end of the bowl, a tube fixed to said plate and projecting through said chamber, an inverted cup disposed in the space defined by said plate and the adjacent end of the bowl, a plurality of spray jets in the end of the bowl communicating with said inverted cup, water conducting means communicating with said soap chamber and the interior of said inverted cup, a plurality of spray jets in the said end of said bowl outside of area defined by said inverted cup and communicating with said tube, a head to which said bowl is attached, a passage in said head communicating with said tube, a port in said head communicating with said soap chamber, a common source of water supply, and means interposed between said common source of water supply and the passage and port in said head and operable to alternately conduct water under pressure to said tube and said soap chamber.

5. A spraying device including a bowl having a soap holding chamber therein, a plate at the outer end of said soap chamber spaced from the end of the bowl, a tube fixed to said plate and projecting through said chamber, an inverted cup disposed in the space defined by said plate and the adjacent end of the bowl, a plurality of spray jets in the end of the bowl communicating with said inserted cup, water conducting means communicating with said soap chamber and the interior of said inverted cup, a plurality of spray jets in the said end of said bowl outside of the area defined by said inverted cup and communicating with said tube, a head to which said bowl is attached, a passage in said head communicating with said tube, a port in said head communicating with said soap chamber, a common source of water supply, means interposed between said common source of water supply and the passage and port in said head and operable to alternately conduct water under pressure to said tube and said soap chamber, a cup disposed on the underside of said head to receive water from said port, and a plurality of apertures in said cup to discharge water therefrom to said soap chamber in spray formation.

6. A spraying device including a bowl having a soap holding chamber therein, a tube projecting through said chamber, a plurality of spray jets arranged in annular formation in one end of said bowl and communicating with said tube, a plurality of spray jets in said end of said bowl within the annular formation of said first jets and communicating with said soap chamber, a head to which said bowl is attached, a passage in said head communicating with the tube, a port in said head communicating with said soap chamber, a common source of water supply, means interposed between said common source of water supply and the passage and port in said head and operable to alternately conduct water under pressure to said tube and said soap chamber, a cup disposed on the underside of said head to receive water from said port, and a plurality of apertures in said cup to discharge water therefrom to said soap chamber in spray formation.

7. A spraying device including a bowl having a soap holding chamber therein, a tube projecting through said chamber, a plurality of spray jets arranged in annular formation in one end of said bowl and communicating with said tube, a plurality of spray jets in said end of said bowl within the annular formation of said first jets, means to by-pass water from said soap chamber to said second jets, a head to which said bowl is attached, a passage in said head communicating with said tube, a port in said head communicating with said soap chamber, a common source of water supply, means interposed between said common source of water supply and the passage and port in said head and operable to alternately conduct water under pressure to said tube and said soap chamber, a cup disposed on the underside of said head to receive water from said port, and a plurality of apertures in said cup to discharge water therefrom to said soap chamber in spray formation.

8. A spraying device including a bowl having a soap holding chamber therein, a tube projecting through said chamber, the outer end of said bowl having a substantially flat central portion and an annular arcuate portion, a plurality of spray jets arranged in said annular portion and communicating with said tube, a plurality of spray jets in said flat central portion of said end of said bowl and communicating with said soap chamber, a head to which said bowl is attached, a passage in said head communicating with said tube, a port in said head communicating with said soap chamber, a common source of water supply, and means interposed between said common source of water supply and the passage and port in said head and operable to alternately conduct water under pressure to said tube and said soap chamber.

9. A spraying device including a bowl having a soap holding chamber therein, a plate at the outer end of said soap chamber spaced from the end of the bowl, a tube fixed to said plate and projecting through said chamber, the outer end of said bowl having a substantially flat central portion and an annular arcuate portion, an inverted cup disposed in the space defined by said plate and the adjacent end of the bowl and substantially covering said flat portion, a plurality of spray jets in the flat portion of said end of said bowl communicating with said inverted cup, water conducting means communicating with said soap chamber and the interior of said inverted cup, and a plurality of spray jets in the annular arcuate portion of said end of said bowl communicating with said tube.

RAYMOND HEALY.